(12) United States Patent
Murphy et al.

(10) Patent No.: US 11,575,317 B2
(45) Date of Patent: Feb. 7, 2023

(54) SWITCHING REGULATOR SYSTEM WITH TRANSITION DETECTION AND FILTER CAPACITOR DISCHARGE CIRCUITRY

(71) Applicant: Qorvo US, Inc., Greensboro, NC (US)

(72) Inventors: Michael J. Murphy, Statesville, NC (US); Michael R. Kay, Summerfield, NC (US)

(73) Assignee: Qorvo US, Inc., Greensboro, NC (US)

( * ) Notice: Subject to any disclaimer, the term of this patent is extended or adjusted under 35 U.S.C. 154(b) by 112 days.

(21) Appl. No.: 16/703,951

(22) Filed: Dec. 5, 2019

(65) Prior Publication Data
US 2020/0212796 A1    Jul. 2, 2020

Related U.S. Application Data

(60) Provisional application No. 62/787,544, filed on Jan. 2, 2019.

(51) Int. Cl.
*H02M 3/07*    (2006.01)
*H02M 3/156*   (2006.01)

(52) U.S. Cl.
CPC ............ *H02M 3/07* (2013.01); *H02M 3/156* (2013.01)

(58) Field of Classification Search
CPC ............ H02M 3/07; H02M 3/00; H02M 3/01; H02M 3/015; H02M 3/02; H02M 3/04; H02M 3/078; H02M 3/10; H02M 3/135; H02M 3/137; H02M 3/139; H02M 3/142; H02M 3/145; H02M 3/155; H02M 3/1552; H02M 3/1555; H02M 3/156;
(Continued)

(56) References Cited

U.S. PATENT DOCUMENTS 5,422,562 A *  6/1995  Mammano ............ H02M 3/156
                                              323/284
6,965,223 B1 * 11/2005  MacLean ................ H02M 1/36
                                              323/284
(Continued)

OTHER PUBLICATIONS

Stanescu, C., "A new circuit technique for improving transient load regulation in low-voltage CMOS LDOs," CAS 2012 (International Semiconductor Conference), Oct. 5-17, 2012, Sinaia, Romania, IEEE, 4 pages.

*Primary Examiner* — Thienvu V Tran
*Assistant Examiner* — Carlos O Rivera-Perez
(74) *Attorney, Agent, or Firm* — Withrow & Terranova, P.L.L.C.

(57) ABSTRACT

A switching regulator system having a switching regulator configured to generate regulated voltage pulses at a switching output in response to a setpoint of an output voltage at a setpoint input and feedback of the output voltage at a feedback input is disclosed. A power inductor is coupled between the switching output and a filtered output, and a filter capacitor is coupled between the filtered output and a fixed voltage node. A transistor having a control input is coupled between the filtered output and the fixed voltage node. A transition comparator has a first comparator input coupled to the setpoint input, a second comparator input coupled to the feedback input, and a comparator output coupled to the control input, wherein the transition comparator is configured to monitor for a setpoint voltage (Continued)

dropping below a feedback voltage and in response turn on the transistor to discharge the filter capacitor.

20 Claims, 6 Drawing Sheets (58) Field of Classification Search
CPC .. H02M 3/1563; H02M 3/1566; H02M 3/157; H02M 3/158; H02M 3/1582; H02M 3/1588; H02M 1/0003; H02M 1/0012; H02M 1/0016; H02M 1/0019; H02M 1/0022; H02M 1/0025; H02M 1/0029; H02M 1/0032; H02M 1/0035; H02M 1/0041; H02M 1/14; H02M 1/143; H02M 1/15; H02M 1/32; H02M 1/322; H02M 1/36; G05F 1/10; G05F 1/44; G05F 1/46; G05F 1/461; G05F 1/462; G05F 1/468; G05F 1/56; G05F 1/562; G05F 1/565; G05F 1/571; G05F 1/575; G05F 1/59; G05F 1/595; G05F 1/62

USPC .............. 323/222–226, 259, 266, 271–276, 323/280–285, 312–317, 351
See application file for complete search history.

(56) References Cited

U.S. PATENT DOCUMENTS

| 8,587,268 | B1* | 11/2013 | Huard | H02M 3/158 323/283 |
| 2005/0073355 | A1* | 4/2005 | Sivero | H02M 3/07 327/536 |
| 2012/0062205 | A1* | 3/2012 | Levesque | H03F 3/245 323/318 |
| 2012/0161728 | A1* | 6/2012 | Chen | H02M 3/1563 327/74 |
| 2012/0313701 | A1* | 12/2012 | Khlat | H03F 1/0277 330/127 |
| 2014/0152284 | A1* | 6/2014 | Rozek | H02M 3/156 323/284 |
| 2016/0126830 | A1* | 5/2016 | Fowers | G05F 3/205 327/536 |
| 2018/0219399 | A1* | 8/2018 | Balakrishnan | H02J 7/007184 |
| 2020/0091816 | A1* | 3/2020 | de Cremoux | H03F 1/025 |

* cited by examiner

SWITCHING REGULATOR SYSTEM WITH TRANSITION DETECTION AND FILTER CAPACITOR DISCHARGE CIRCUITRY

RELATED APPLICATIONS

This application claims the benefit of provisional patent application Ser. No. 62/787,544, filed Jan. 2, 2019, the disclosure of which is hereby incorporated herein by reference in its entirety.

FIELD OF THE DISCLOSURE

The present disclosure relates to switching regulator systems, which are used in radio frequency transmitters as part of wireless communications systems.

BACKGROUND

An impressive growth of high bandwidth applications for radio frequency handheld devices has led to increased demand for efficient power-saving techniques to increase battery life. Because the radio frequency power amplifier of the mobile device consumes a large percentage of the overall power budget of the mobile device, various switching regulator systems have been proposed to increase the overall power efficiency of the radio frequency power amplifier. As such, there remains a need to further improve the power efficiency of mobile devices to provide extended battery life. In this regard, there is a need to improve the switching regulator systems of mobile devices.

SUMMARY

A switching regulator system having a switching regulator configured to generate regulated voltage pulses at a switching output in response to a setpoint of an output voltage received at a setpoint input and feedback of the output voltage received at a feedback input is disclosed. A power inductor is coupled between the switching output and a filtered output, and a filter capacitor is coupled between the filtered output and a fixed voltage node. A transistor has a first current terminal coupled to the filtered output, a second current terminal coupled to the fixed voltage node, and a control input. A transition comparator has a first comparator input coupled to the setpoint input, a second comparator input coupled to the feedback input, and a comparator output coupled to the control input, wherein the transition comparator is configured to monitor for a setpoint voltage dropping below a feedback voltage and in response to turn on the transistor to discharge the filter capacitor.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
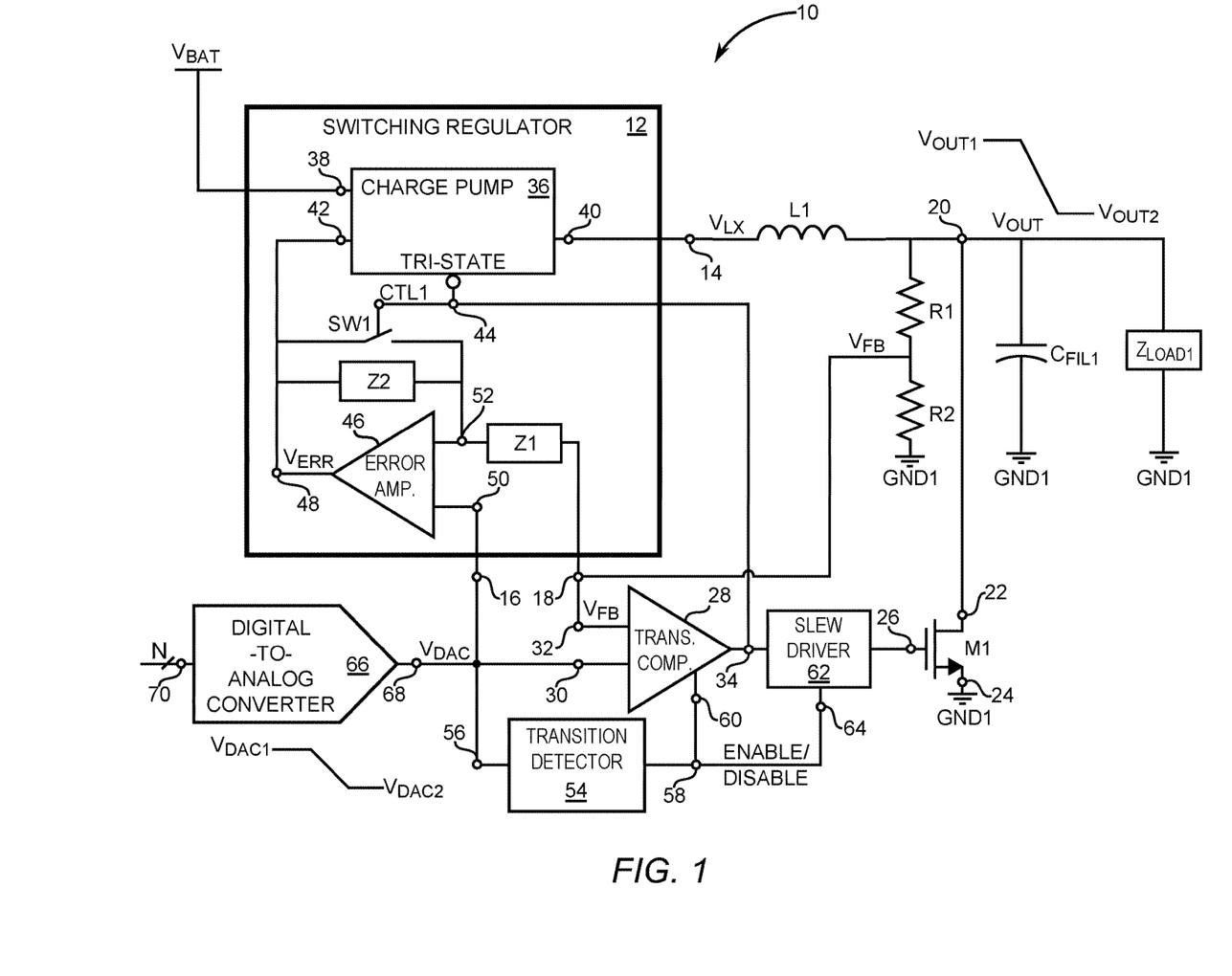
FIG. 1 is a schematic diagram of a switching regulator system that is structured in accordance with the present disclosure.

FIG. 1 is a schematic diagram of a switching regulator system 10 that is structured in accordance with the present disclosure. The switching regulator system 10 includes a switching regulator 12 configured to generate regulated voltage pulses at a switching output 14 in response to a setpoint of an output voltage received at a setpoint input 16 and feedback of the output voltage received at a feedback input 18.

A power inductor L1 is coupled between the switching output 14 and a filtered output 20. In exemplary embodiments, the power inductor L1 has an inductance between 0.5 microhenry±10% and 3 microhenries±10%. A filter capacitor $C_{FIL1}$ is coupled between the filtered output 20 and a fixed voltage node GND1, which in this exemplary embodiment is ground. In exemplary embodiments, the filter capacitor $C_{FIL1}$ has a capacitance that is between 0.5 microfarad±10% and 15 microfarads±10%.

A transistor M1 has a first current terminal 22 coupled to the filtered output 20, a second current terminal 24 coupled to the fixed voltage node GND1, and a transistor control terminal 26. In exemplary embodiments, the transistor M1 is a field-effect transistor (FET) configured to discharge the filter capacitor $C_{FIL1}$ with a current of between 0.25 ampere±10% and 10 amperes±10%. In the exemplary embodiment of FIG. 1, the first current terminal 22 is a drain terminal, the second current terminal 24 is a source terminal, and the transistor control terminal 26 is a gate terminal. A load $Z_{LOAD1}$ is typically coupled between the filtered output 20 and the fixed voltage node GND1.

A transition comparator 28 has a first comparator input 30 coupled to the setpoint input 16, a second comparator input 32 coupled to the feedback input 18, and a comparator output 34 coupled to the transistor control terminal 26. The transition comparator 28 is configured to monitor for a setpoint voltage $V_{DAC}$ dropping below a feedback voltage $V_{FB}$ and in response to turn on the transistor M1 to discharge the filter capacitor $C_{FIL1}$.

The switching regulator 12 includes a charge pump 36 that has a supply voltage input 38 for drawing power from a voltage source $V_{BAT}$, a pump output 40 coupled to the switching output 14, and a switching control input 42 for adjusting voltage level of the output voltage provided at the pump output 40 and the switching output 14. In this exemplary embodiment, the charge pump 36 further includes a tri-state input 44 through which the pump output 40 may be tri-stated when the charge pump 36 is not in operation providing the output voltage at the pump output 40.

The switching regulator 12 further includes an error amplifier 46 having an error output 48 coupled to the switching control input 42, a first error input 50 coupled to the setpoint input 16, and a second error input 52 coupled to the feedback input 18. In the exemplary embodiment of FIG. 1, the second error input 52 is coupled to the feedback input 18 through a first gain-set impedance Z1. A second gain-set impedance Z2 is coupled between the second error input 52 and the error output 48. A voltage gain of the error amplifier 46 is set by a ratio of the first gain-set impedance Z1 and the second gain-set impedance Z2. A switch SW1 is coupled across the second gain-set impedance Z2. A switch control CTL1 is coupled to the comparator output 34 and is configured to close and short the second gain set impedance Z2 when the transition comparator 28 detects a transition from a higher setpoint voltage $V_{DAC1}$ to a lower setpoint voltage $V_{DAC2}$. During operation, the gain of the error amplifier 46 is set to unity when the switch SW1 is closed. In this exemplary embodiment, the tri-state input 44 is also coupled to comparator output 34 so that pump output 40 is in a tri-state mode when the switch SW1 is closed.

In the exemplary embodiment of FIG. 1, the switching regulator system 10 further includes a transition detector 54 having a detector input 56 coupled to the setpoint input 16 and an enable output 58 coupled to an enable input 60 of the transition comparator 28. The transition detector 54 is configured to detect the setpoint voltage $V_{DAC}$ dropping below the feedback voltage $V_{FB}$ and in response generate an enable signal at the enable output 58 that enables the transition comparator 28. The transition detector 54 is further configured to disable the transition comparator 28 when the setpoint voltage $V_{DAC}$ rises above the feedback voltage $V_{FB}$.

Additionally, a slew driver 62 is coupled between the comparator output 34 and the transistor control terminal 26. The slew driver 62 has a slew enable input 64 coupled to the enable output 58 of the transition detector 54. The slew driver 62 is configured to slow a transition time of the transistor M1 from an off-state to an on-state by a predetermined amount when the enable signal is activated. In at least one embodiment, the slew driver 62 is a FET buffer having an on-state channel resistance that combined with input capacitance of the transistor M1 determines the transition time of the transistor from the off-state to the on-state.

Moreover, in this exemplary embodiment, a digital-to-analog converter 66 has an analog output 68 that is coupled to the setpoint input 16, the first comparator input 30, and the detector input 56. The digital-to-analog converter 66 also has a digital input 70 for receiving a digital setpoint value that is N bits in magnitude. The digital input 70 is typically coupled to a digital output of a baseband processor (not shown). The digital-to-analog converter 66 is configured to generate a setpoint voltage $V_{DAC}$ in response to a digital value received at the digital input 70. For example, a higher setpoint voltage $V_{DAC1}$ is dropped to a lower second setpoint voltage $V_{DAC2}$ as a result of the digital setpoint value being lowered in magnitude at the digital input 70. In response, the switching regulator 12 lowers the output voltage $V_{OUT}$ from, for example, a higher output voltage $V_{OUT1}$ to a lower output voltage $V_{OUT2}$. In general, the setpoint voltage $V_{DAC}$ rises and falls in proportion with the digital setpoint value and in turn the output voltage $V_{OUT}$ rises and falls in proportion with the setpoint voltage $V_{DAC}$.

Figure 2:
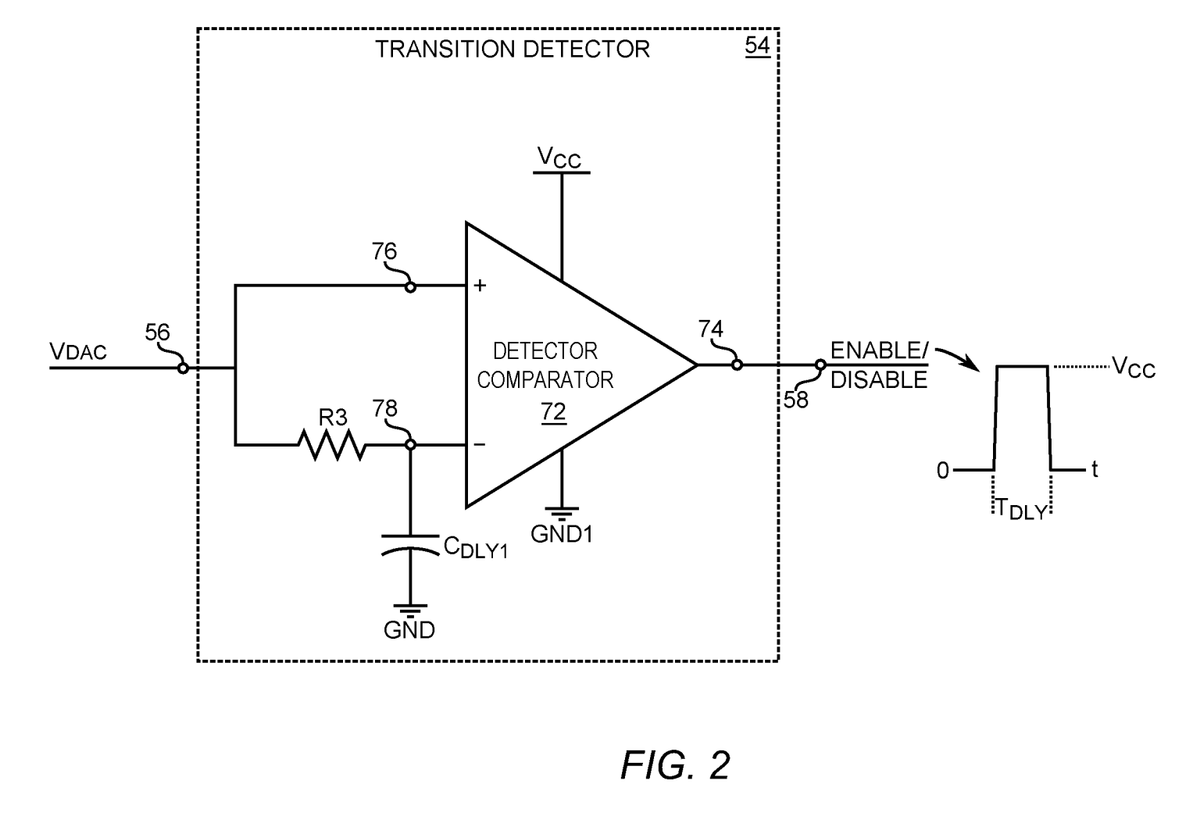
FIG. 2 is a schematic diagram of a transition detector that is structured in accordance with the present disclosure.

FIG. 2 is a schematic diagram of the transition detector 54 that is structured in accordance with an exemplary embodiment of the present disclosure. A detector comparator 72 has a detector output 74 that is coupled to the enable output 58, and a non-inverting input 76 is coupled to the detector input 56 and an inverting input 78. A resistor R3 is coupled between the detector input 56 and the inverting input 78, and a capacitor $C_{DLY1}$ is coupled between the inverting input 78 and the fixed voltage node, which in this exemplary case is ground GND. The transition detector 54 is configured to hold the enable signal active, which in this case is logic high, for a duration determined by a resistance of the resistor R3 and a capacitance of the capacitor $C_{DLY1}$. In this exemplary case, logic low is about 0 V and logic high is about equal to a supply voltage $V_{CC}$. In at least some embodiments, a time constant of the resistor R3 and capacitor $C_{DLY1}$ provides a time delay $T_{DLY}$ that is between 1 microsecond and 5 microseconds. In some embodiments, the resistor R3 has a resistance between 100 kilohms to 500 kilohms, and in other embodiments the resistor R3 has a resistance between 500 kilohms and 1 megohm. Moreover, in some embodiments the capacitor $C_{DLY1}$ has a capacitance between 1 picofarad and 5 picofarads, and in other embodiments the capacitor $C_{DLY1}$ has a capacitance between 5 picofarads and 10 picofarads.

Figure 3:
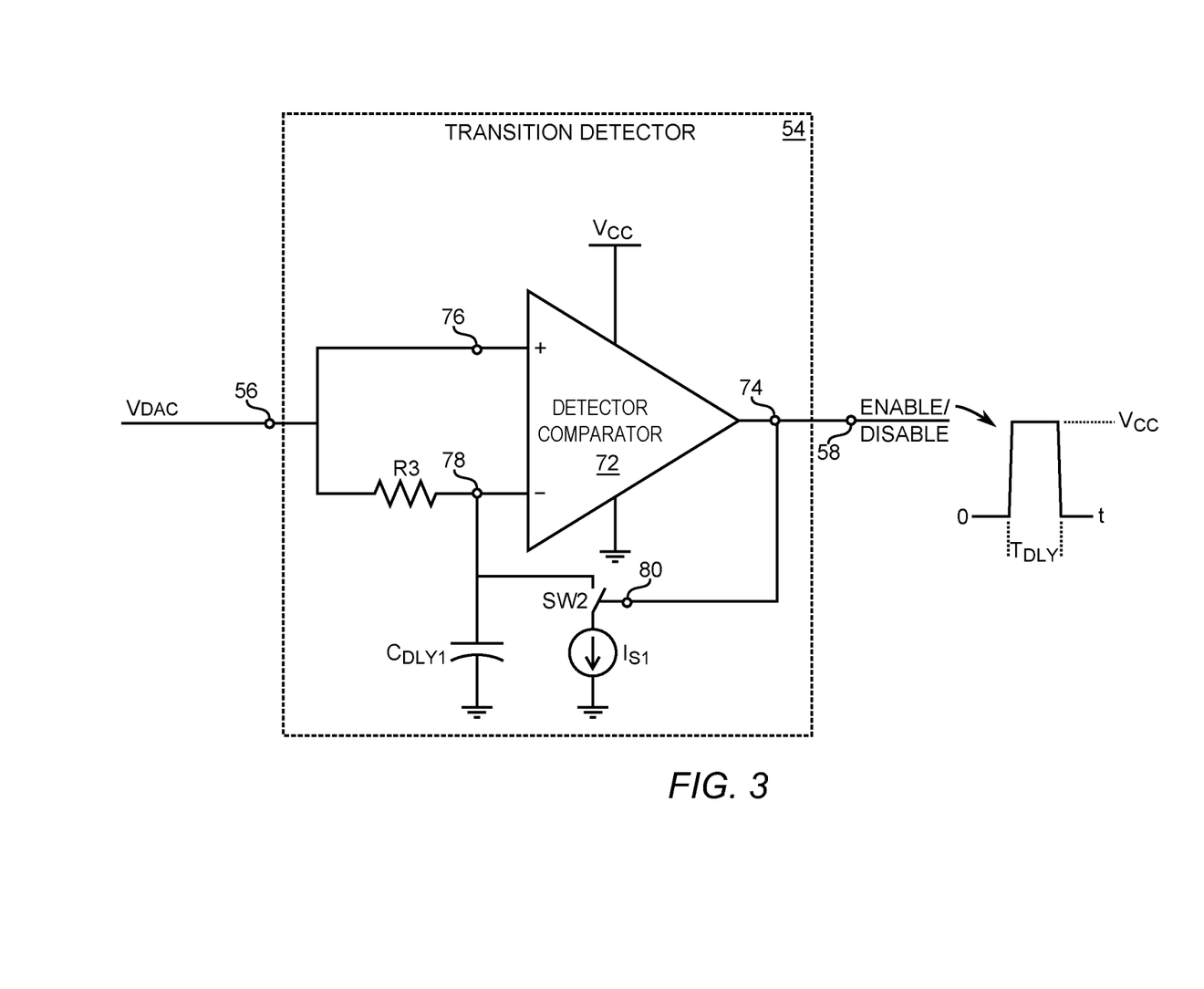
FIG. 3 is a schematic diagram of a modified version of the transition detector of FIG. 2.

FIG. 3 is a schematic diagram of a modified version of the transition detector 54 of FIG. 2. In this exemplary embodiment, the transition detector 54 further includes a second electronic switch SW2 coupled in series with a current source $I_{S1}$ between the inverting input 78 and the fixed voltage node GND1. The second electronic switch SW2 has a control input 80 coupled to the detector output 74 and is configured to close when the enable signal is active.

Figure 4:
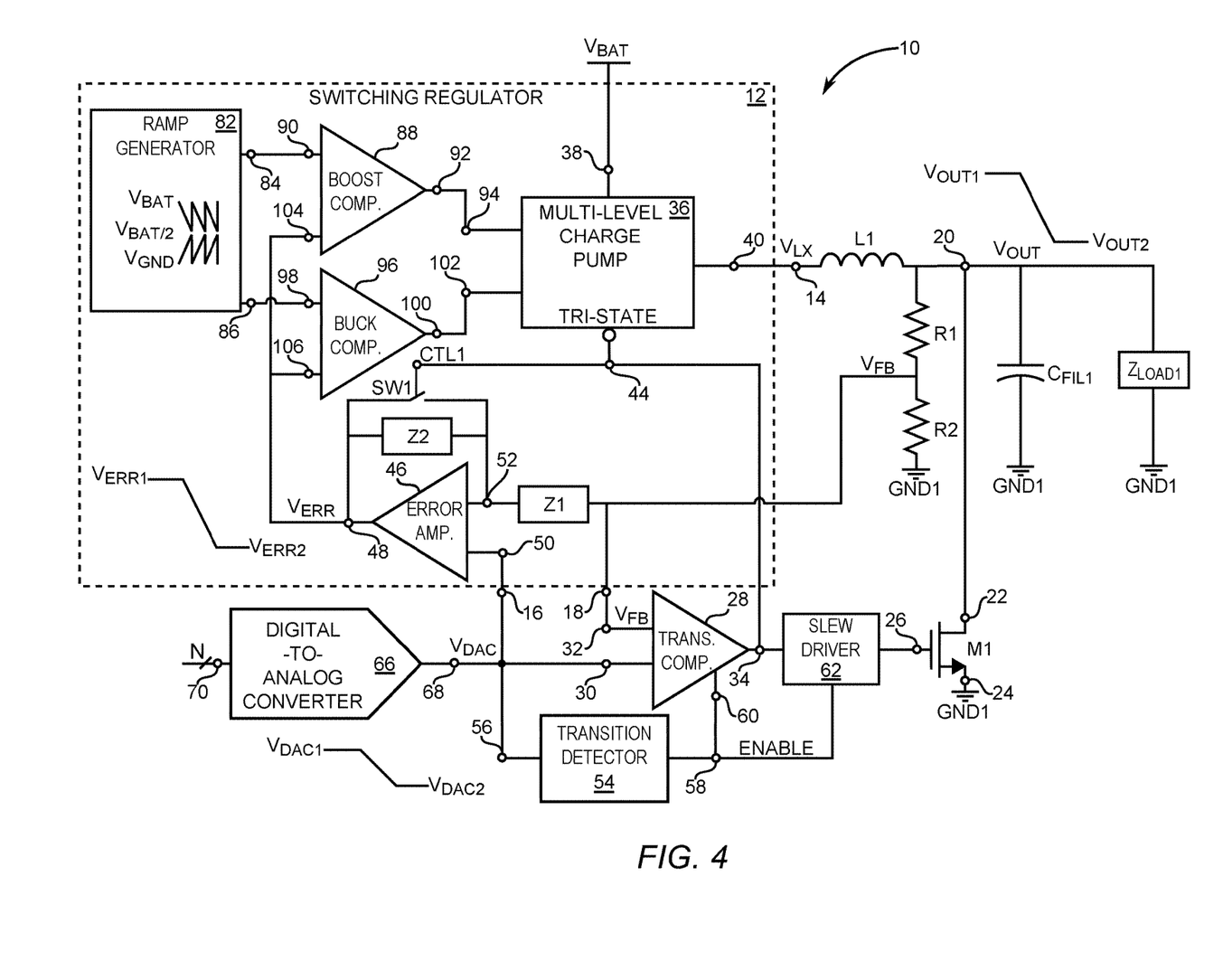
FIG. 4 is a schematic diagram of another embodiment of the switching regulator system that includes a ramp generator configured to drive a charge pump of the multi-level output type.

FIG. 4 is a schematic diagram of another exemplary embodiment of the switching regulator system 10 that is structured in accordance with the present disclosure. In this particular embodiment, the charge pump 36 is a multi-level charge pump that is responsive to a ramp generator 82 having a first ramp output 84 and a second ramp output 86. The ramp generator 82 provides through the first ramp output 84 a first ramp signal that oscillates between the voltage source $V_{BAT}$ and $V_{BAT/2}$. The ramp generator 82 further provides through the second ramp output 86 a second ramp signal that oscillates between voltage source $V_{BAT/2}$ and ground voltage $V_{GND}$.

In this exemplary embodiment, a boost comparator 88 has a first boost input 90 coupled to the first ramp output 84 and a boost output 92 coupled to a first switching control input 94 of the charge pump 36. A buck comparator 96 has a first buck input 98 coupled to the second ramp output 86 and a buck output 100 coupled to a second switching control input 102 of the charge pump 36. A second boost input 104 of the boost comparator 88 and a second buck input 106 of the buck comparator 96 are both coupled to the error output 48 of the error amplifier 46.

In operation, the switch regulator system 10 reduces voltage transition time and settling time of the output voltage $V_{OUT}$. The transistor M1 sinks a majority of the current from the filter capacitor $C_{FIL1}$ to the fixed voltage node GND1 when the digital-to-analog converter 66 responds the digital setpoint value being lowered in magnitude at the digital input 70. The transistor M1 is controllable independent of the switching regulator 12. For independent control, the transition detector 54 senses a negative transition of the setpoint voltage $V_{DAC}$ and turns on the transistor M1 to sink the current only during the negative voltage transition. The transition comparator 28 compares feedback voltage $V_{FB}$ with the setpoint voltage $V_{DAC}$ and keeps the transistor M1 on and conducting current until the feedback voltage $V_{FB}$ is a few hundred millivolts above a final setpoint voltage $V_{DAC}$ value. Optionally, output from the transition comparator 28 also forces the charge pump 36 into a high impedance state by way of the tri-state input 44 so that current flow through the power inductor L1 to the charge pump 36 is minimized. The transition comparator 28 may also be configured to close switch SW1, which forces the error amplifier 46 into unity gain feedback configuration where error voltage $V_{ERR}$=feedback voltage $V_{FB}$. This action prohibits the error voltage $V_{ERR}$ from moving to either supply rail $V_{BAT}$ or fixed voltage node GND1 as the transistor M1 sinks the current from the filter capacitor $C_{FIL1}$. The unity gain set of the error amplifier 46 also allows the error voltage $V_{ERR}$ to be in proximity to the desired settled value when the switch SW1 is opened after the voltage transition is complete. This is particularly useful if the ramp generator 82 and reference circuits are based on voltage source $V_{BAT/2}$. When the transition comparator 28 senses that feedback voltage $V_{FB}$ is lower than setpoint voltage $V_{DAC}$ plus any desired offset, switch SW1 is opened, the charge pump 36 is returned to normal operation, the transistor M1 is disabled, and the switching regulator loop regains control of output voltage $V_{OUT}$. Given that the error voltage $V_{ERR}$ is at the approximate desired output value, a transition provided by the switch regulator system 10 results in minimal disturbance to output voltage $V_{OUT}$.

Figure 5:
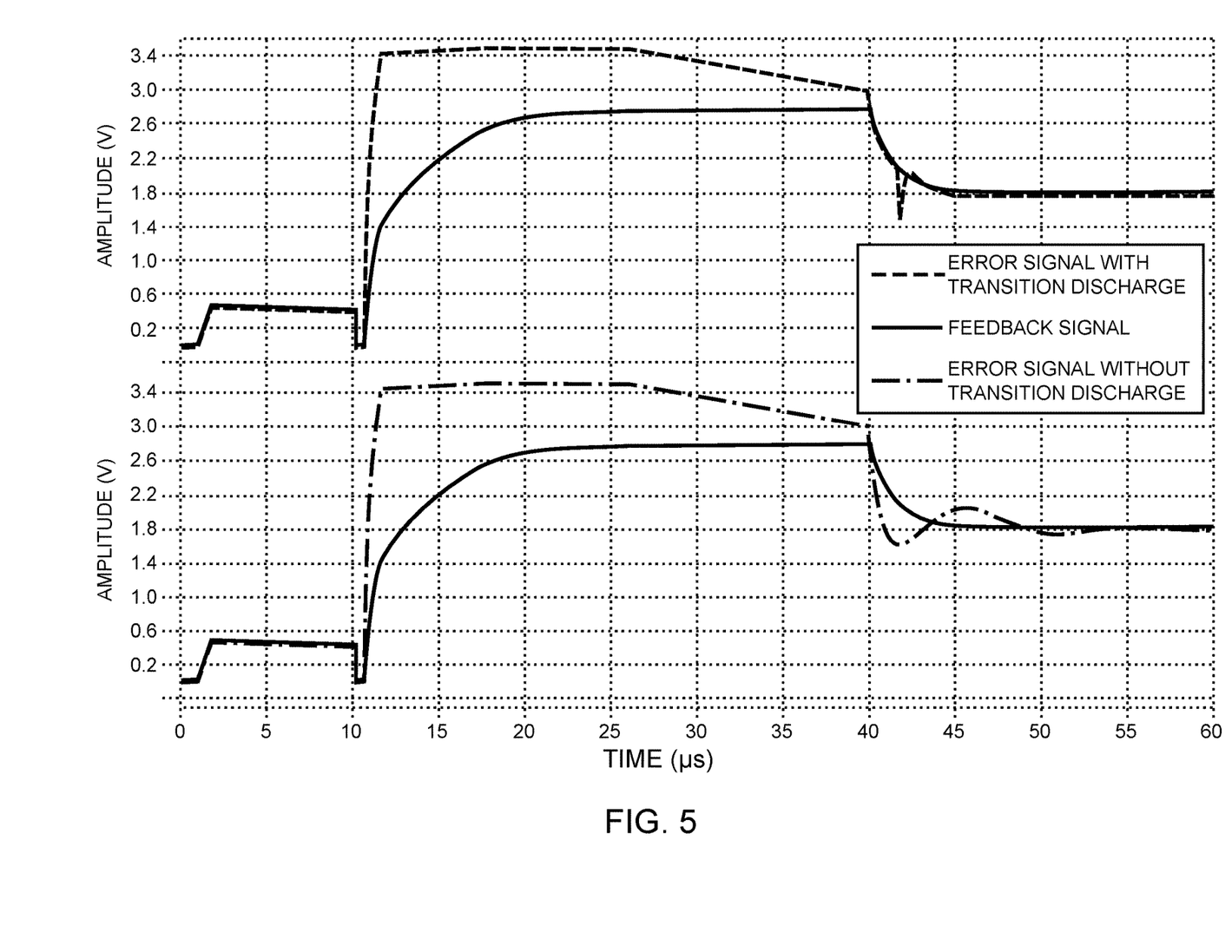
FIG. 5 is a graph showing an example of error voltage and feedback voltage produced by the switching regulator system during operation with the transition detector functioning and without the transition detector functioning.

FIG. 5 is a graph showing an example of error voltage and feedback voltage produced by the switching regulator system 10 during operation with the transition detector 54 functioning and without the transition detector 54 functioning. In particular, FIG. 5 shows that during transition, switching regulation enhancements provided by the transition comparator 28, the transition detector 54, the slew driver 62, and the transistor M1 (FIGS. 1 and 4) result in reduced disturbance in the error voltage $V_{ERR}$, which in turn results in reduced disturbance in output voltage $V_{OUT}$.

Figure 6A:
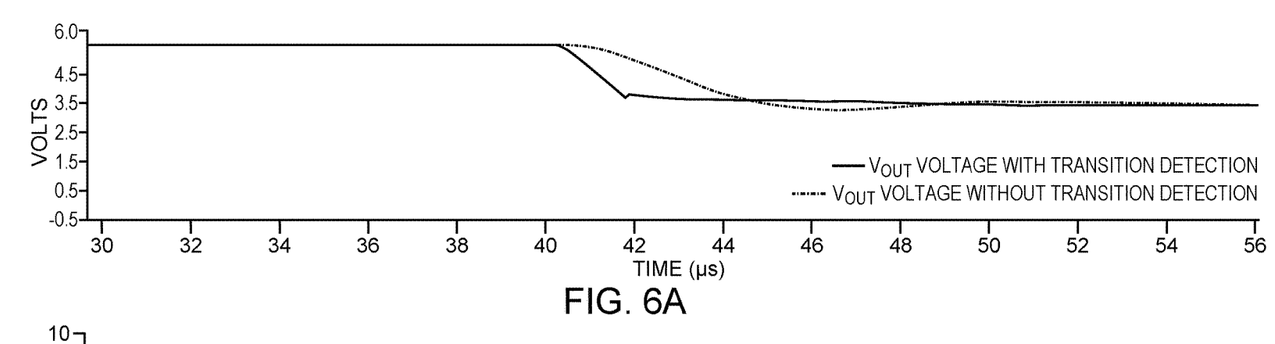
FIG. 6A is a graph showing an example of transient response of filtered output voltage when the switching regulator system of the present disclosure is in operation.

FIG. 6A is a graph showing an example of transient response of output voltage $V_{OUT}$ when the switching regulator system 10 is in operation with and without transition detection. Without transition detection, the transition is based on the loop bandwidth of the switching regulator 12, which can be greater than a few microseconds. With transition detection, the transition time is dependent on the resistor-capacitor time constant of the on-resistance and output capacitance of the transistor M1. The transistor M1 can be sized to achieve a faster discharge that is independent of the loop bandwidth of the switching regulator 12.

Figure 6B:
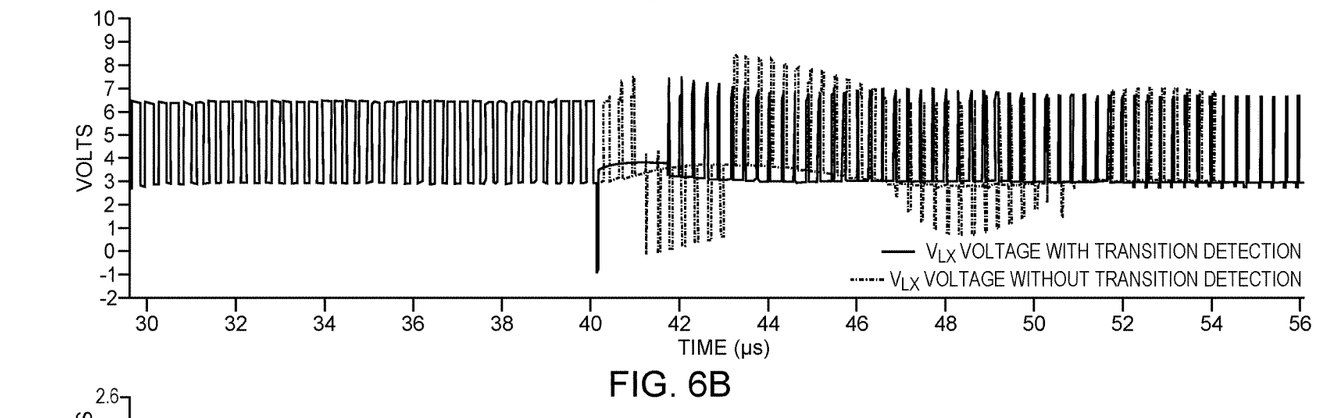
FIG. 6B is a graph showing an example of transient response of charge pump output voltage when the switching regulator system of the present disclosure is in operation.

FIG. 6B is a graph showing an example of transient response of charge pump output voltage when the switching regulator system 10 is in operation. Therefore, a peak voltage level for a switching voltage $V_{LX}$ at the switching output 14 is held below an overvoltage level with transition detection. In fact, an opportunity for overvoltage that is typically a problem without transition detection is eliminated by the disclosed switching regulator system 10.

Figure 6C:
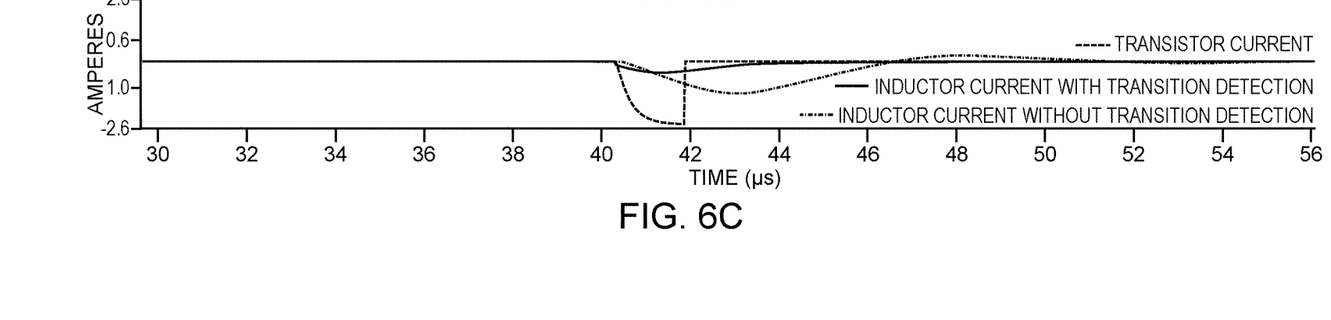
FIG. 6C is a graph showing an example of transient response of power inductor current when the switching regulator system of the present disclosure is in operation.

FIG. 6C is a graph showing an example of transient response of current flowing in power inductor L1 when the switching regulator system 10 of the present disclosure is in operation. The peak inductor current is at least four times lower with transition detection than without transition detection because most of a discharge current flowing from the filter capacitor $C_{FIL1}$ flows through the transistor M1 during a transition event.

Those skilled in the art will recognize improvements and modifications to the preferred embodiments of the present disclosure. All such improvements and modifications are considered within the scope of the concepts disclosed herein and the claims that follow.

What is claimed is:

1. A switching regulator system comprising:
a switching regulator configured to generate regulated voltage pulses at a switching output in response to a setpoint of an output voltage received at a setpoint input and feedback of the output voltage received at a feedback input;
a filter capacitor coupled between a filtered output and ground, wherein the filtered output is coupled to the switching output through a power inductor;
a transistor configured to provide a discharge path that discharges the filter capacitor with a current between 0.25 ampere±10% and 10 amperes±10%, wherein the discharge path bypasses the power inductor with the transistor having a first current terminal coupled to the filtered output, a second current terminal coupled directly to ground, and a control input;
a transition comparator having a first comparator input coupled to the setpoint input, a second comparator input coupled to the feedback input, and a comparator output coupled to the control input, wherein the transition comparator is configured to monitor for a setpoint voltage dropping below a feedback voltage and in response turn on the transistor to discharge the filter capacitor; and
a slew driver coupled between the comparator output and the control input of the transistor, wherein the slew driver is configured to slow a transition time of the transistor from an off-state to an on-state by a predetermined amount.

2. The switching regulator system of claim 1 further comprising the power inductor coupled between the switching output and the filtered output.

3. The switching regulator system of claim 2 wherein the power inductor has an inductance between 0.5 microhenry and 3 microhenries.

4. The switching regulator system of claim 1 wherein the transition comparator is configured to turn on the transistor to completely discharge the filter capacitor.

5. The switching regulator system of claim 1 wherein the filter capacitor has a capacitance between 0.5 microfarad and 15 microfarads.

6. The switching regulator system of claim 1 wherein the transistor is a field-effect transistor (FET) configured to discharge the filter capacitor with a current of between 0.25 ampere and 10 amperes.

7. The switching regulator system of claim 1 further including a charge pump having a pump output coupled to the switching output and a tri-state input coupled to the comparator output, the charge pump being configured to place the switching output in a high impedance state in response to the transition comparator turning on the transistor.

8. The switching regulator system of claim 7 further comprising:
an error amplifier having an error output coupled to a pump control input of the charge pump, a first error input coupled to the setpoint input, and second error input coupled to the feedback input through a first impedance and coupled to the error output through a second impedance; and
an electronic shorting switch coupled across the second impedance and having a shorting control input coupled to the comparator output, wherein the electronic shorting switch is configured to short the second impedance in response to the transition comparator turning on the transistor.

9. The switching regulator of claim 7 wherein the charge pump is a buck/boost type charge pump.

10. The switching regulator system of claim 1 further comprising a transition detector having a detector input coupled to the setpoint input and an enable output coupled to an enable input of the transition comparator, wherein the transition detector is configured to detect the setpoint voltage dropping below the feedback voltage and in response to generate an enable signal at the enable output.

11. The switching regulator system of claim 10 wherein the transition detector comprises:
a detector comparator having a detector output coupled to the enable output, a non-inverting input coupled to the detector input and an inverting input;
a resistor coupled between the detector input and the inverting input; and
a capacitor coupled between the inverting input and ground, wherein the transition detector is configured to hold the enable signal active for a duration determined by a resistance of the resistor and a capacitance of the capacitor.

12. The switching regulator system of claim 11 wherein a time constant of the resistor and capacitor is between 1 microsecond and 5 microseconds.

13. The switching regulator system of claim 11 wherein the resistor has a resistance between 100 kilohms and 500 kilohms.

14. The switching regulator system of claim 11 wherein the capacitor has a capacitance between 1 picofarad and 5 picofarads.

15. The switching regulator system of claim 11 wherein the resistor has a resistance between 500 kilohms and 1 megohm.

16. The switching regulator system of claim 11 wherein the capacitor has a capacitance between 5 picofarads and 10 picofarads.

17. The switching regulator system of claim 11 wherein the transition detector further comprises an electronic switch coupled in series with a current source between the inverting input and ground, wherein the electronic switch has a control input coupled to the detector output and is configured to close when the enable signal is active.

18. The switching regulator system of claim 10 wherein the slew driver has an enable input coupled to an enable output of the transition detector.

19. The switching regulator system of claim 1 wherein the slew driver is a FET buffer having an on-state channel resistance that combined with input capacitance of the transistor determines the transition time of the transistor from the off-state to the on-state.

20. The switching regulator system of claim 1 further comprising a digital-to-analog converter having an analog output coupled to the setpoint input and a digital input, wherein the digital-to-analog converter is configured to generate the setpoint voltage at the analog output corresponding to a digital number received at the digital input.

* * * * *